Oct. 3, 1939.  H. J. McC. BURDICK  2,174,965
MULTIPLE VALVE CONTROL
Filed Sept. 19, 1938
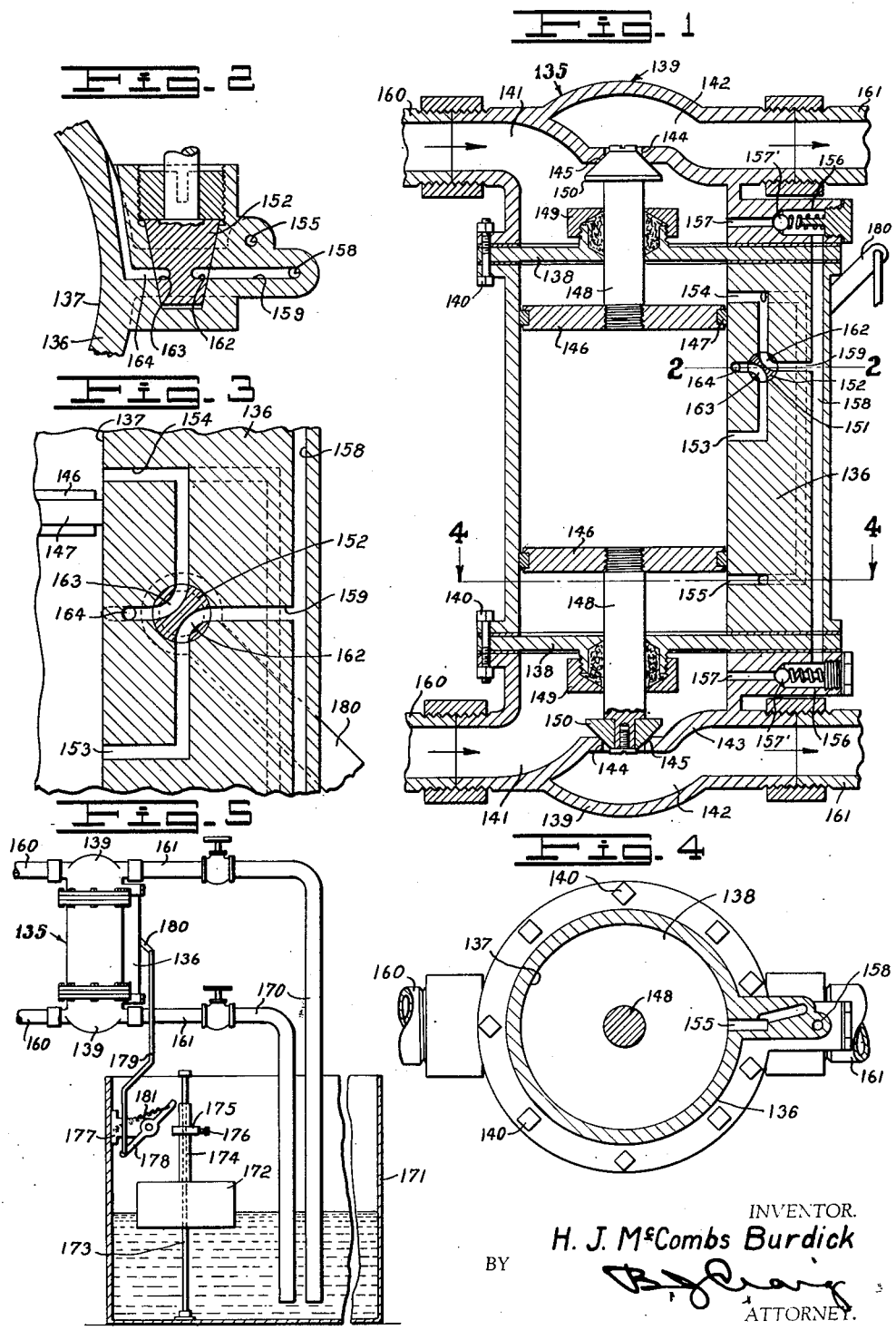
INVENTOR.
H. J. McCombs Burdick
BY
ATTORNEY.

Patented Oct. 3, 1939

2,174,965

UNITED STATES PATENT OFFICE 2,174,965

MULTIPLE VALVE CONTROL

Harry J. McCombs Burdick, Anaheim, Calif.

Application September 19, 1938, Serial No. 230,569

5 Claims. (Cl. 137—144)

This invention relates to fluid control devices.

The general object of the invention is to provide a device which is adapted to automatically control the flow of fluid.

A more specific object of the invention is to provide a fluid control device including a valve member with novel means for operating the valve to open and closed position.

An additional object of the invention is to provide a fluid operated valve mechanism adapted to simultaneously control the passage of fluid through a plurality of pipes.

Other objects and the advantages of the invention will be apparent from the following description taken in connection with the accompanying drawing, wherein:

Fig. 1 is a central, sectional view through a multiple valve;

Fig. 2 is a section taken on line 2—2 of Fig. 1;

Fig. 3 is a fragmentary, sectional view on an enlarged scale showing the valve mechanism in the wall of the cylinder in the device shown in Fig. 1;

Fig. 4 is a section taken on line 4—4 of Fig. 1; and

Fig. 5 is an elevation, partly in section, showing the device of Fig. 1 operatively installed.

Referring to the drawing by reference characters I have shown my invention as embodied in a valve device which is indicated generally at 135. As shown the device 135 includes a body portion 136 having an open ended cylinder portion 137 therein. Each end of the cylinder portion is shown as closed by partitions 138. The partitions 138 engage flanges on the body 136 and on end members 139 and are secured to the body portion by bolts and nuts 140.

The end members 139 each include a pair of chamber members 141 and 142 which are separated by a partition 143 having an aperture 144 therein. A valve seat portion 145 surrounds each aperture 144. Positioned in the cylinder portion 137 I provide a pair of piston members 146 which include suitable packing material or piston rings 147 at the periphery to tightly engage the walls of the cylinder 137. Each of the pistons 146 has a rod 148 suitably secured thereto which extends out of the cylinder 137 through a suitable packing gland 149 on the partitions 138. Opposite each piston 146 the associated rod 148 has a valve member 150 thereon which is adapted to engage a valve seat 145 to restrict passage between each chamber 141 and 142 in the end members 139.

At one side of the cylinder 137 the body 136 has a valve recess 151 therein in which a valve member 152 is positioned. The valve member 152 may be operated in any desired manner. The body 136 has a conduit 153 therein which at one end opens into the cylinder 137 intermediate the length thereof and at the opposite end opens into the valve recess 151. Opposite the conduit 153 the body has a conduit 154 therein which at one end opens into the valve recess 151 and at the opposite end opens into the cylinder 137 at the side of one of the pistons.

The body 136 has another conduit 155 therein which at one end opens into the conduit 154 and at the opposite end opens into the cylinder 137 at the side of the other piston. Each of the end members 139 has a valve recess 156 and a conduit 157 therein. One end of the conduit 157 opens into the valve 156 and the opposite end opens into the valve 141. Positioned in the valve recess 156 I provide a spring pressed ball valve 157' which normally prevents passage from the valve recess 156 through the conduit 157 into the chamber 141. The body and the end members 139 have a conduit 158 which at one end communicates with one of the valve recesses 156 and at the opposite end communicates with the other valve recess 156. Adjacent the valve recess 151 the body 136 has a conduit 159 therein which at one end communicates with the conduit 158 and at the opposite end opens into the valve recess 151. As shown in the drawing the chambers 141 of the end members are adapted to communicate with a conduit 160 having fluid under pressure therein and the chambers 142 are adapted to communicate with the conduit 161.

The valve members 152 have a pair of grooves 162 and 163 therein and the construction is such that when the valve 152 is in one position the groove 162 at one end communicates with the conduit 154 and at the opposite end communicates with the conduit 159 and the valve slot 163 at one end communicates with a conduit 164 in the body 136. When the valve 152 is turned to another position the valve groove 162 at one end communicates with the conduit 153 and at the opposite end with the conduit 159 and the valve groove 163 at one end communicates with the conduit 154 and at the opposite end with the conduit 164.

When the pistons 146 at the extreme outer position and the valves 150 engage the valve seats 145 as shown in Fig. 1 and it is desired to move the valves 150 out of engagement with the valve seats 145 the valve 152 is turned to the position shown in Fig. 1 wherein the valve aperture 162 affords communication between the conduits 159 and 154.

When the valve 152 is in this position the fluid under pressure in the chambers 141 will flow through the conduits 157 past the ball valves 157' and into the conduit 158, thence through the conduit 159, the valve groove 162, into the conduits 154 and 155, and thence into the cylinder 137 on the side of the pistons 146 opposite the conduit 153.

As the fluid enters the cylinder 137 on the outside of pistons 146 it forces the pistons towards each other thereby moving the valves 150 out of engagement with the valve seats 145. As the pistons 146 move toward each other the fluid in the cylinder 137 between the pistons 146 passes out through the conduit 153, through the valve groove 163 and to the conduit 164. When it is desired to again move the valves 150 into engagement with the valve seats 145 the valve 152 is turned to a position wherein the valve aperture 163 at one end communicates with the conduit 154 and the opposite end communicates with the conduit 164 and the valve aperture 162 at one end communicates with the conduit 153 and at the opposite end communicates with the conduit 159. Fluid under pressure will then flow through the chambers 141 through the conduits 157 past the ball valves 157' into the conduit 158 thence into the conduit 159 and through the valve apertures 162 and through the conduit 153 into the cylinder 137 between the pistons 146 whereupon the pistons 146 will be moved outwardly until the valves 150 engage the valve seats 145.

In Fig. 5 I show an installation including the valve device 135 in which the outlets 161 communicate through pipes 170 with a tank 171 in which a float 172 is mounted on a guide 173. The float has a tube 174 thereon and an adjustable trip 175 which may be held on the tube 174 by a set screw 176. The tank includes a bracket 177 on which a lever 178 is pivoted. One end of the lever 178 is connected by a rod 179 with an arm 180 on the valve 152 while the other end of the lever 178 is in the path of movement of the trip 175.

Assuming that the lever 180 has just been manually moved to the position shown in Fig. 1 and that the valve 152 has just taken the position shown in this figure, fluid then flows through the conduits 154 and 155 into the cylinder to cause the pistons to move together and thus unseat the valves 150. At the same time fluid passes from the cylinder through the conduit 153.

This causes fluid to pass through the pipe 161 into the tank 173 thus causing the fluid 172 to rise and move the trip 175 upwardly. When the trip has been raised a sufficient distance it engages the free end of the lever 178 and rocks this lever over the center of its pivot so that the lever is pulled by a spring 181. The rocking of the lever 178 moves the rod 179 and moves the valve lever 180 to the position shown in Figs. 3 and 4. When the valve 152 is in this position fluid enters the cylinder 137 through the conduit 153 thus pushing the pistons 146 apart and closing the valves 150. It will be apparent that with this construction a single fluid control device may be made to automatically shut off a plurality of valves by fluid pressure exerted by the fluid passing through the control device.

From the foregoing description it will be apparent that I have invented a novel fluid control device which can be economically manufactured, which is simple in construction and operation and which is highly efficient in use.

Having thus described my invention I claim:

1. In a valve device, a cylinder having a closure at each end, a pair of pistons in said cylinder, each of said pistons having a plunger rod thereon, a valve mounted on the end of each of said plunger rods, a fitting secured at each end of said cylinder, each of said fittings having a hollow body having an inlet and an outlet with a valve seat affording communication therebetween, each of said valves being adapted to engage one of said seats, and means to afford communication between said inlets and the space intermediate the pistons to simultaneously operate said pistons.

2. In a valve device, a cylinder having a closure at each end, a pair of pistons in said cylinder, each of said pistons having a plunger rod thereon, a valve mounted on the end of each of said plunger rods, a fitting secured at each end of said cylinder, each of said fittings having a hollow body having an inlet and an outlet with a valve seat affording communication therebetween, each of said valves being adapted to engage one of said seats, and valved conduit means adapted in one position of the valve to admit fluid to each end of the cylinder to discharge fluid from between the cylinder and in another position of the valve being adapted to direct fluid from the inlets to the space between said pistons and to direct fluid from the end of the cylinder.

3. In a valve device, a cylinder having a closure at each end, a pair of pistons in said cylinder, each of said pistons having a plunger rod thereon, a valve mounted on the end of each of said plunger rods, a fitting secured at each end of said cylinder, each of said fittings having a hollow body having an inlet and an outlet with a valve seat affording communication therebetween, each of said valves being adapted to engage one of said seats, said cylinder including a conduit at one end communicating with the cylinder intermediate the pistons and also communicating with the cylinder adjacent each end closure, said cylinder including another conduit communicating with said first conduit, said second conduit also having valve controlled communication with said inlets, a valve at the juncture of said conduits adapted to admit fluid to each end of the cylinder and to discharge fluid from between the cylinder and adapted in another position to direct fluid from the inlets to the space between said pistons and to direct fluid from the end of the cylinder.

4. In a valve device, a cylinder having a closure at each end, a pair of pistons in said cylinder, each of said pistons having a plunger rod thereon, a valve mounted on the end of each of said plunger rods, a fitting secured at each end of said cylinder, each of said fittings having a hollow body having an inlet and an outlet with a valve seat affording communication therebetween, said valves being adapted to engage said seats, conduit means communicating with the cylinder intermediate the pistons and also communicating with the cylinder adjacent each end closure, other conduit means communicating with said first conduit means and also having valve controlled communication with said inlets, a valve at the juncture of said conduits, said cylinder having a passageway to the atmosphere, said last mentioned valve in one position being disposed to admit fluid to each end of the cylinder and to discharge fluid between the pistons to the atmosphere and said valve in another position being adapted to direct fluid from the inlets to the space between said pistons and to direct fluid from the ends of the cylinder to the atmosphere.

5. In a valve device, a cylinder having a closure at each end, a pair of pistons in said cylinder, each of said pistons having a plunger rod thereon, a valve mounted on the end of each of said plunger rods, a fitting secured at each end of said cylinder, each of said fittings having a hollow body having an inlet and an outlet with a valve seat affording communication therebetween, each of said valves being adapted to engage one of said seats, said cylinder having a passageway in the wall thereof, said passageway at one end communicating with the cylinder intermediate the pistons and also communicating with the cylinder adjacent each end closure, said cylinder and said fittings having another passageway communicating with said first passageway, said second passageway also having valve controlled communication with said inlets, a valve at the juncture of said first and second passageways, said cylinder having a passageway to the atmosphere, said last mentioned valve in one position being disposed to admit fluid to each end of the cylinder and to discharge fluid between the pistons to the atmosphere and said valve in another position being adapted to direct fluid from the inlets to the space between said pistons and to direct fluid from the end of the cylinder to the atmosphere.

HARRY J. McCOMBS BURDICK.